(12) United States Patent
Santana-Gallego

(10) Patent No.: US 8,888,127 B2
(45) Date of Patent: Nov. 18, 2014

(54) PROTECTIVE DEVICE FOR PROTECTING AN OCCUPANT OF A VEHICLE, A SEAT, AND AN ASSOCIATED VEHICLE

(75) Inventor: Tomas Santana-Gallego, Aix en Provence (FR)

(73) Assignee: Airbus Helicopters, Marignane Cedex (FR)

(*) Notice: Subject to any disclaimer, the term of this patent is extended or adjusted under 35 U.S.C. 154(b) by 176 days.

(21) Appl. No.: 13/353,790

(22) Filed: Jan. 19, 2012

(65) Prior Publication Data

US 2012/0193899 A1    Aug. 2, 2012

(30) Foreign Application Priority Data

Jan. 28, 2011  (FR) ...................................... 11 00267

(51) Int. Cl.
| | |
|---|---|
| *B60R 21/18* | (2006.01) |
| *B60N 2/42* | (2006.01) |
| *B60R 22/12* | (2006.01) |
| *B60R 21/26* | (2011.01) |
| *B60R 21/268* | (2011.01) |
| *B60R 21/017* | (2006.01) |
| *B64D 11/06* | (2006.01) |
| *B60R 21/2338* | (2011.01) |
| *B60R 21/276* | (2006.01) |
| *B60R 21/00* | (2006.01) |
| *B60R 21/239* | (2006.01) |

(52) U.S. Cl.
CPC ............... *B60R 21/18* (2013.01); *B60R 21/268* (2013.01); *B60R 21/017* (2013.01); *B64D 2011/061* (2013.01); *B60R 2021/23386* (2013.01); *B64D 2201/00* (2013.01); *B60R 2021/2765* (2013.01); *B64D 2011/0668* (2013.01); *B60R 2021/0016* (2013.01); *B60R 2021/2395* (2013.01); *B60R 2021/23382* (2013.01)
USPC .......... 280/736; 280/733; 280/739; 297/216.1

(58) Field of Classification Search
CPC ............ B60R 21/18; B60R 2021/0016; B60R 2021/23386; B60R 21/017; B60R 2021/2395; B60R 2021/2338; B60R 2021/23382; B64D 2201/00
USPC ......................... 280/733, 736, 739; 297/216.1
See application file for complete search history.

(56) References Cited

U.S. PATENT DOCUMENTS 3,756,620 A * 9/1973 Radke ........................ 280/743.2
4,260,075 A   4/1981 Mackal (Continued)

FOREIGN PATENT DOCUMENTS

| EP | 1418093 A1 | 5/2004 |
| EP | 1616760 A1 | 1/2006 |
| JP | 11170963 A | 6/1999 |

OTHER PUBLICATIONS

Search Report and Written Opinion; Application No. FR 1100267; dated Sep. 23, 2011.

*Primary Examiner* — Nicole Verley
*Assistant Examiner* — Joselynn Y Sliteris
(74) *Attorney, Agent, or Firm* — Brooks Kushman P.C.

(57) ABSTRACT

A protective device (10) for protecting an occupant (7) of a vehicle (1), said protective device comprising an airbag (11) and inflation means (12) for inflating said airbag (11), the inflation means (12) being connected to the airbag (11) via a feed pipe (13) for feeding inflation fluid for the purpose of inflating the airbag (11) under predetermined conditions. This protective device further comprises expulsion means (20) for expelling said fluid, which expulsion means co-operate with at least one water detection means (15) so as to act when water is detected to remove said fluid resulting from inflation of the airbag (11), said airbag (11) being provided with a peripheral elastic strap (50) for optimizing the deflation of said airbag (11) when said expulsion means (20) allow said fluid to be removed from the airbag (11).

13 Claims, 3 Drawing Sheets

(56) References Cited

U.S. PATENT DOCUMENTS

| | | |
|---|---|---|
| 4,498,604 A | 2/1985 | Mackal |
| 5,062,662 A | 11/1991 | Cameron |
| 5,857,246 A | 1/1999 | Becnel |
| 6,024,116 A | 2/2000 | Almberg |
| 6,332,629 B1 | 12/2001 | Midorikawa |
| 6,378,898 B1 | 4/2002 | Lewis |
| 6,930,611 B1 | 8/2005 | Van Druff |
| 7,413,218 B2 | 8/2008 | Ekdahl |
| 7,434,833 B2 * | 10/2008 | Kore .............................. 280/733 |
| 2006/0012159 A1 | 1/2006 | Kore |
| 2011/0285408 A1 * | 11/2011 | Satake et al. .................. 324/679 |

* cited by examiner

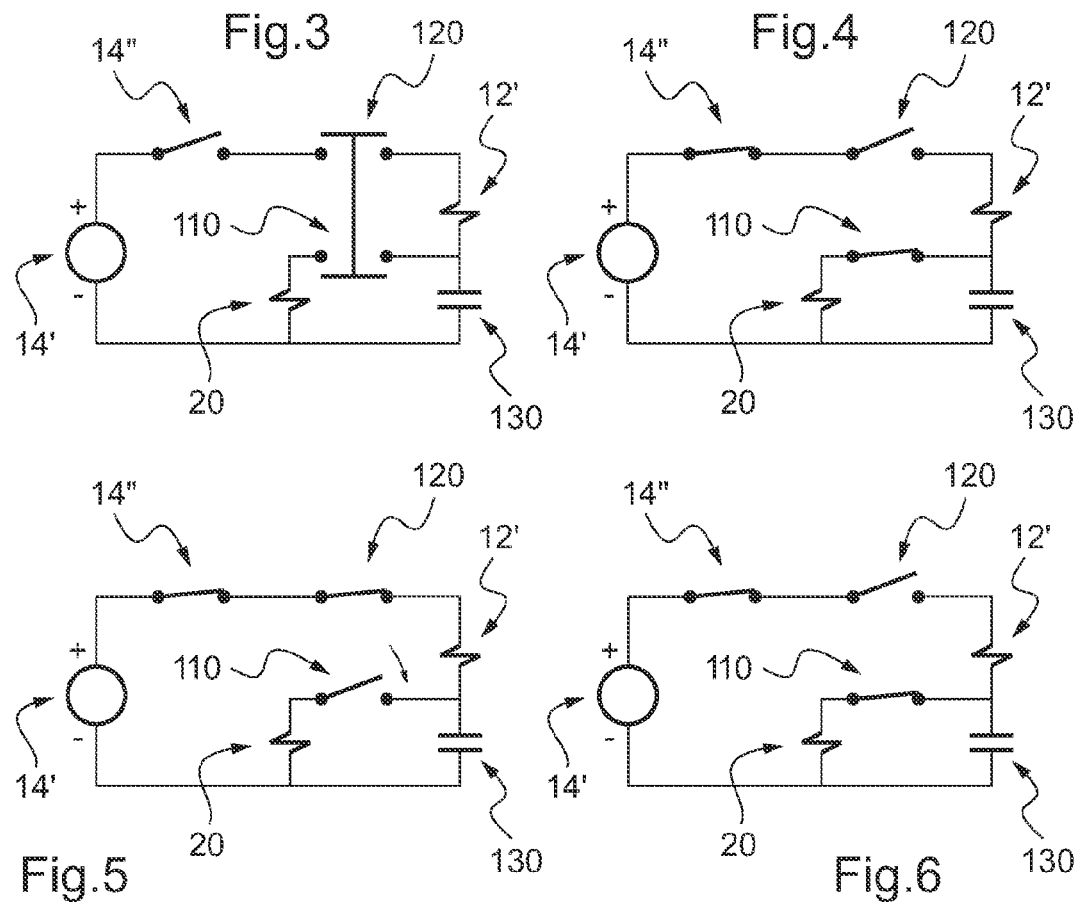
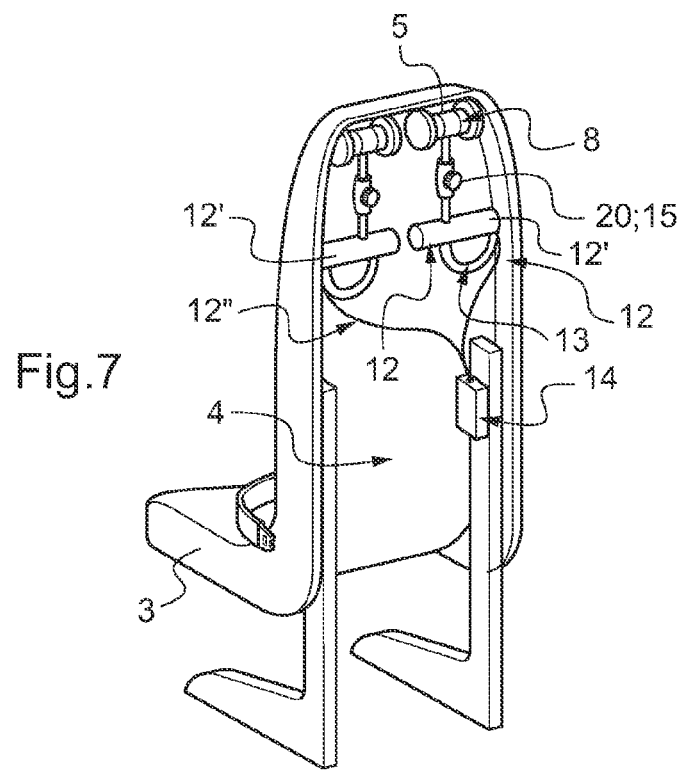

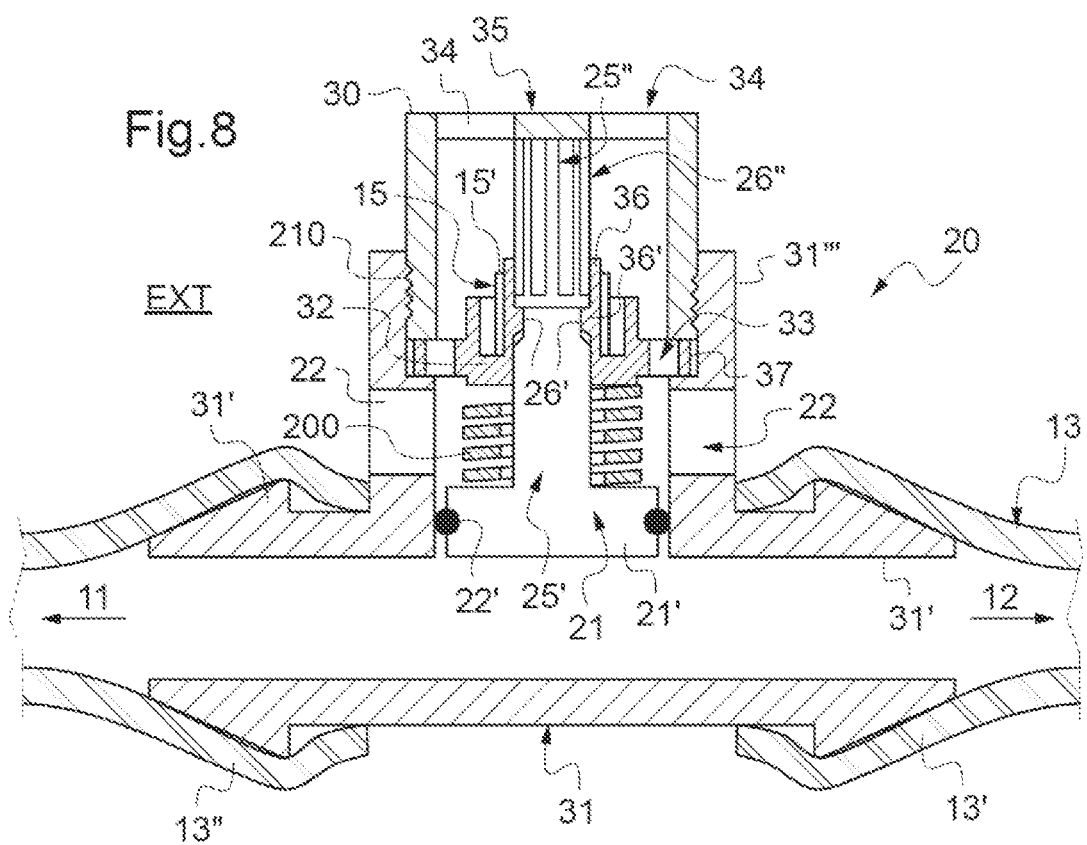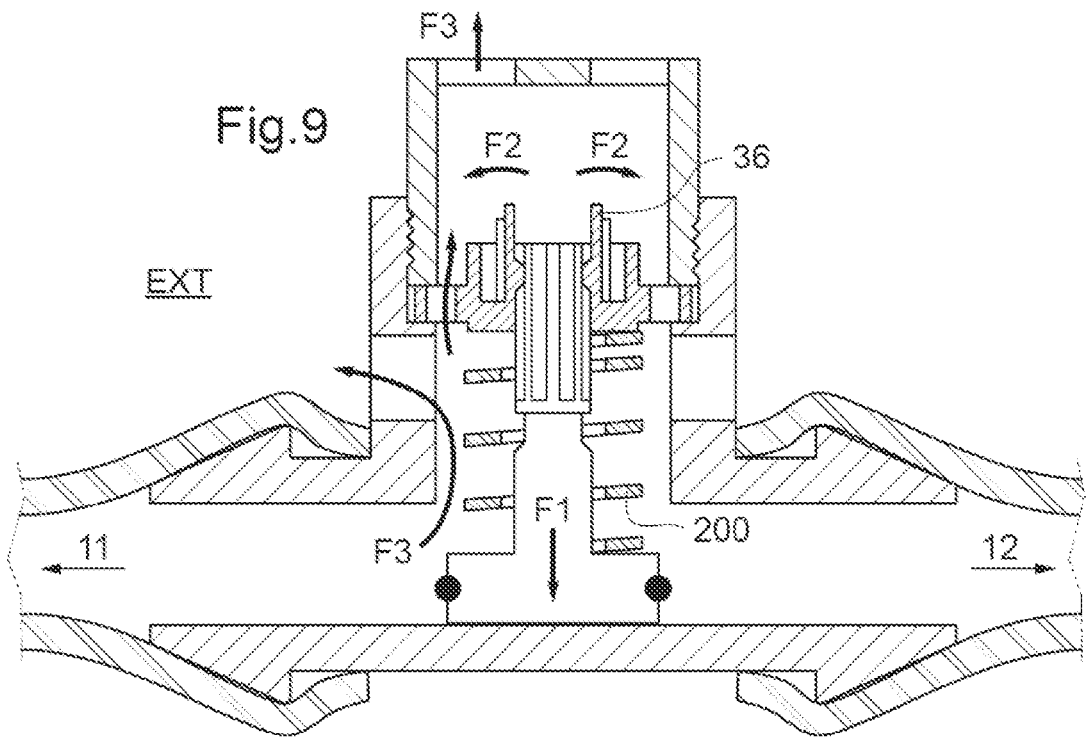

PROTECTIVE DEVICE FOR PROTECTING AN OCCUPANT OF A VEHICLE, A SEAT, AND AN ASSOCIATED VEHICLE

CROSS REFERENCE TO RELATED APPLICATIONS

This application claims priority to FR 11 00267 filed on Jan. 28, 2011, the disclosure of which is incorporated in its entirety by reference herein.

BACKGROUND OF THE INVENTION (1) Field of the Invention

The present invention relates to a protective device for protecting an occupant of a vehicle, to a seat, and to an associated vehicle. It relates more particularly to an aircraft, such as a rotary-wing aircraft.

(2) Description of Related Art

In particular, airbags are known that inflate when an impact occurs to protect an occupant of a vehicle.

Such airbags may be installed in dashboards, in seats, or in partitions defining the spaces for accommodating the occupant to be protected. As described in Document EP 1 616 760, it is also possible to provide reusable airbags in seatbelts, for example.

It is common for motor vehicles to have such airbags. Aircraft and in particular rotary-wing aircraft also sometimes have airbags.

Airbags make it possible to reduce the forces to which occupants of a vehicle are subjected during an accident in order to preserve their physical integrity. In addition, airbags limit the extent to which the heads of occupants of the vehicle move, and form barriers against impacts with the members of the vehicle that become potentially dangerous during such accidents.

However, an aircraft might have to make an emergency landing on a liquid surface, i.e. it might have to ditch. Certain emergency landing or ditching scenarios can require an airbag to be deployed for a non-negligible duration, rather than merely at a particular instant.

Deploying an airbag over a relatively long duration following a ditching on water raises a potential difficulty. There is a non-zero risk that the space surrounding an occupant of the aircraft might fill with water. The airbag can then constitute a major obstacle that needs to be overcome so that the occupant can exit from the aircraft before going under.

Documents U.S. Pat. No. 5,857,246 and U.S. Pat. No. 6,930,611 disclose devices suitable for opening a seatbelt buckle or seat harness buckle on coming into contact with a liquid.

Documents U.S. Pat. No. 4,498,604 and U.S. Pat. No. 4,260,075 disclose a device for inflating an article, such as a life jacket, on coming into contact with a liquid, that device involving a member that is soluble in water.

Document U.S. Pat. No. 6,024,116 also discloses such a device in a field remote from the problem to be addressed, namely the technical field of boilers.

In addition, it should be noted that Document U.S. Pat. No. 6,378,898 mentions the use of a system for deflating an airbag after a predetermined lapse of time.

Document EP 1 418 093 describes an airbag co-operating with inflation means. In addition, the described device is provided with a vent and with a tube, and with means for retaining the tube.

Finally, Document JP 11170963 would appear to describe a device for preventing an airbag from being triggered when in the presence of water.

BRIEF SUMMARY OF THE INVENTION

An object of the present invention is then to provide a protective device for protecting an occupant of a vehicle, and in particular of an aircraft, that is effective even in the event of contact with a surface of water, this protective device reducing or indeed removing the risk of unduly trapping the occupant in the vehicle, e.g. in the event that water enters the vehicle.

The invention provides a protective device for protecting an occupant of a vehicle, said protective device comprising an airbag and inflation means for inflating said airbag, the inflation means being connected to the airbag via a feed pipe for feeding inflation fluid for the purpose of inflating the airbag under predetermined conditions, in particular following an accident of the emergency landing type for an aircraft.

Reference can be made to the literature for obtaining information about airbag inflation means and about said predetermined conditions.

This device is remarkable in particular in that it further comprises expulsion means for expelling the inflation fluid, which expulsion means co-operate with at least one detection means for detecting a predetermined event so as to act when such a predetermined event occurs to remove said inflation fluid resulting from inflation of the airbag, subsequently to inflation of the airbag, the airbag being provided with a peripheral elastic strap for optimizing the deflation of the airbag when the valve allows the inflation fluid to be removed from the airbag.

Thus, under the predetermined conditions, the inflation means inflate the airbag so as to protect an occupant of the vehicle. For example, the inflation means inject air under pressure into the airbag.

Since the strap of the airbag is elastic, said strap stretches and does not hinder inflation of the airbag.

The expulsion means are then in a closed first position and prevent the inflation fluid from exiting from the airbag. It should be noted that the term "expulsion means" is used to mean a valve, a flap, or any other equivalent means, such as, for example, a piston, suitable for closing off an outlet orifice in the first position.

Conversely, if the detection means detect occurrence of a predetermined event, e.g. chosen from a list including the presence of water, the presence of fire, and the opening of a seat harness subsequently to inflation of the airbag, the detection means authorize the expulsion means to go over from the first position to a second position allowing the inflation fluid to be removed from the airbag.

Since the elastic strap is fastened to the casing defining the airbag or, for example, to two end zones of said airbag, the pressure exerted by said elastic strap on the casing delivers sufficient energy to drive the inflation fluid out of the airbag through the expulsion means.

Therefore, the airbag gives rise to hindrance that is at least minimized compared with the hindrance from a conventional protective device during evacuation of the occupant from the vehicle.

The invention may have one or more of the following characteristics.

For example, the expulsion means may be arranged on the feed pipe. The airbags are then not provided with any vents, thereby, in particular, making them easier to manufacture.

The pressure exerted by the strap makes it possible for the expulsion means to be arranged in such a manner.

In another aspect, the expulsion means may comprise an outlet orifice for enabling the inflation fluid to exit towards the environment outside the device and a moving member suitable for preventing inflation fluid from passing through said outlet orifice in the absence of a predetermined event. The detection means then co-operate with the moving member to allow the inflation fluid to pass through the outlet orifice in the presence of said predetermined event, e.g. in the presence of water.

In an active, electrical embodiment, the detection means transmit an electrical signal to a control unit such as a microprocessor or equivalent electronic means for example, said control unit instructing an electric motor to move the moving member into the expulsion second position for expelling the inflation fluid.

In a passive mechanical embodiment, the detection means include water detection means provided with soluble means co-operating with the moving member.

For example, the soluble means are constituted by a soluble ring pressing a holding member against a locking portion of the moving member. In the presence of water, the soluble ring dissolves. As a result, the moving member is no longer held against the holding member and moves so as to occupy said second position.

In addition, the inflation means may firstly comprise an inflator connected to the airbag via the feed pipe, and secondly comprise a control unit connected to the inflator, the control unit instructing the inflator to inflate the airbag under said predetermined conditions.

For example, during emergency landing, the control unit requires the airbag to be inflated, the inflator including for example explosive means or electrical means.

In addition, the control unit may include an electrical battery and a changeover switch connected in series to the inflator, the expulsion means being connected electrically to the inflator and to the control unit.

Depending on whether a predetermined condition is present or absent, the changeover switch electrically powers or does not electrically power the inflator.

In an aspect of an electrical embodiment, the detection means may comprise a sensor for sensing a predetermined event, which sensor is connected electrically to a main switch arranged between the inflator and the expulsion means, the main switch being closed when the predetermined event occurs, a capacitor being connected electrically in parallel with said expulsion means and with the main switch between the inflator and the control unit.

In addition, the detection means have, for example, a secondary switch arranged between the control unit and the inflator and co-operating with the detection means.

As a result, in the absence of a predetermined event, the main switch is open. If the control unit electrically powers the inflator, the capacitor is charged electrically, while the expulsion means are inhibited.

Conversely, if a predetermined event occurs, the main switch is closed. If a secondary switch is present, said secondary switch interrupts the electrical connection going from the control unit to the expulsion means. The expulsion means, e.g. constituted by a solenoid valve, are however driven by being electrically powered by the capacitor.

In addition to a protective device as described above, the invention also provides a vehicle seat provided with said protective device.

The airbag may then be arranged on a seat harness of said seat.

In addition, in a first variant, water detection means may be arranged on the seat, e.g. on the expulsion means for expelling the inflation fluid.

In a second variant, with the seat having a seat proper zone and a seat back zone, detection means are mounted remote relative to said zones.

For example, on an aircraft, a water detection member of the detection means is disposed in a space liable to fill with water immediately following impact, so as to optimize evacuation of the occupant from the aircraft.

Finally, the invention also provides a vehicle including a protective device as described above, in particular an aircraft, and more particularly a rotary-wing aircraft.

BRIEF DESCRIPTION OF THE SEVERAL VIEWS OF THE DRAWINGS

The invention and its advantages appear in more detail in the following description of embodiments given by way of non-limiting example, and with reference to the accompanying figures, in which:

FIGS. 1 to 6 are diagrams showing a first embodiment;

FIG. 7 is a diagram showing a second embodiment; and

FIGS. 8 and 9 are section views of expulsion means.

Elements that are present in more than one distinct figures bear like references.

DETAILED DESCRIPTION OF THE INVENTION

Figure 1:
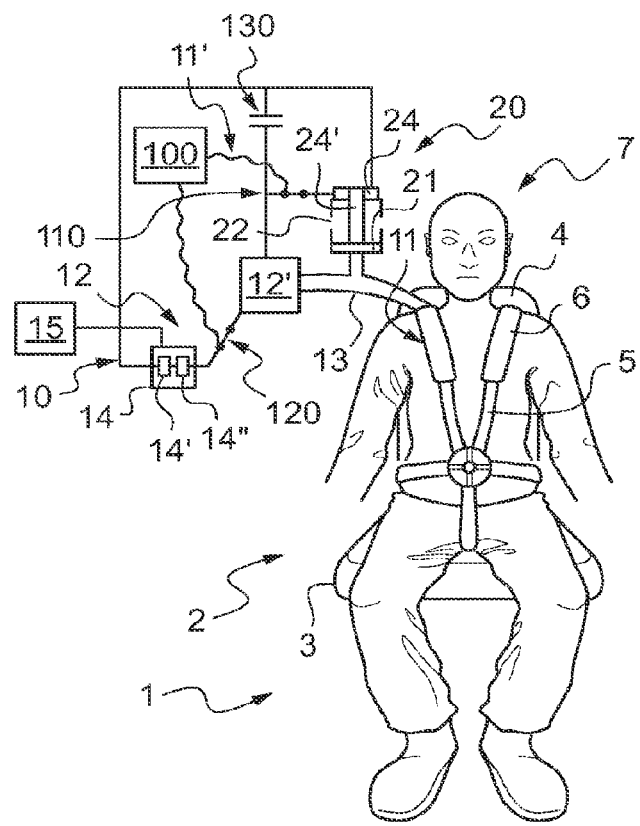

FIG. 1 shows a vehicle 1. The vehicle is not shown distinctly so as not to overcrowd FIG. 1. Said vehicle can be an aircraft and in particular a rotary-wing aircraft such as a helicopter.

The vehicle 1 is provided with a seat 2 comprising a seat proper zone 3 and a seat back zone 4 for seating an occupant 7.

In order to protect the physical integrity of the occupant under predetermined emergency conditions, the seat 2 has a seat harness 6.

In addition, the vehicle 1 is equipped with a protective device 10 comprising at least one airbag 11 that is inflatable when said emergency conditions occur, e.g. an airbag 11 not provided with a vent and received in a recess in the seat harness 6.

The protective device 10 is then provided with at least one inflation means 12 connected to an airbag 11 via a feed pipe 13. The inflation means may comprise an inflator 12' proper connected to the airbag via the feed pipe 13, and a control unit 14 connected to the inflator 12'. The control unit 14 comprises usual sensors for determining whether predetermined conditions are satisfied and for instructing the inflator 12' to inflate the airbags 11 when necessary.

In addition, the protective device 10 further comprises expulsion means 20 and detection means 15 for detecting a predetermined event, the detection means 15 co-operating with the expulsion means 20 to require deflation of the airbag 11 when a predetermined event occurs.

Figure 2:
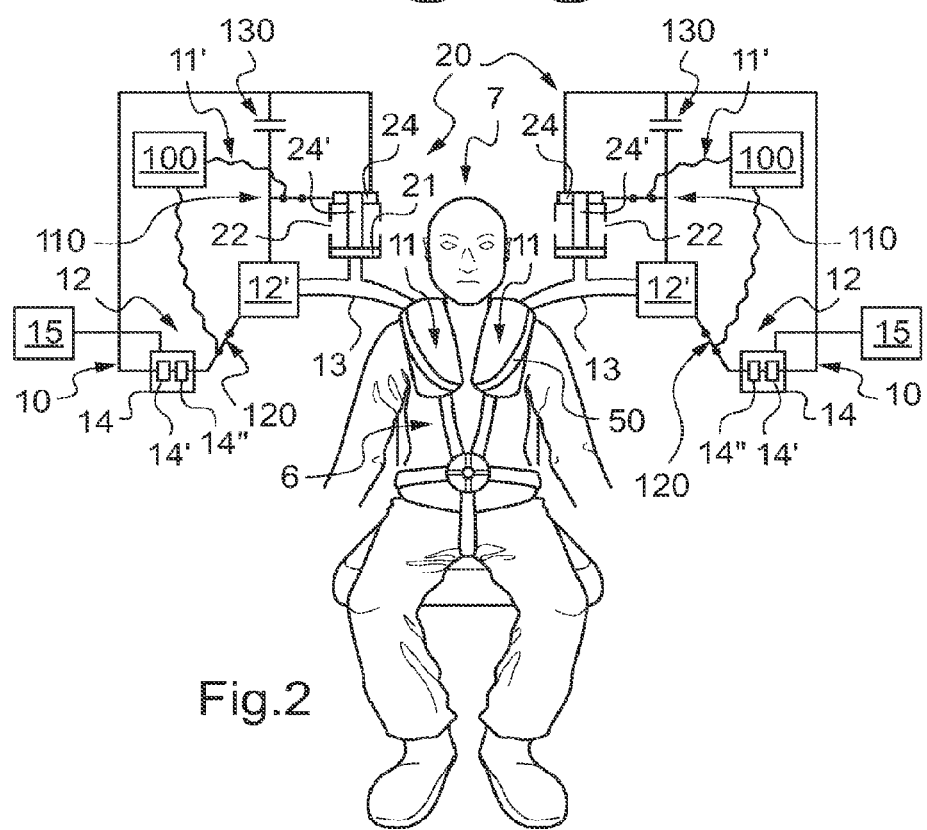

With reference to FIG. 2, the inflation means 12 feed the airbag 11 with inflation fluid under predetermined conditions in order to deploy this airbag 11. For example, on detecting a predetermined condition, the control unit 14 sends an electrical signal to the inflator 12', said inflator 12' then inflating the airbag 11. It should be noted that the control unit may control a plurality of inflators 12', each inflator being connected via a feed pipe to a respective airbag 11.

The airbags 11 are then deployed out of their recesses to protect the occupant 7, namely out of the recesses provided in the seat harness 6, for example.

However, if water detection means 15 detect the presence of water, then the expulsion means 20 for deflating an airbag expel the inflation fluid from the airbag 11 in order to make it easier for the occupant 7 to exit to the outside of the vehicle 1.

In order to facilitate expulsion of the inflation fluid from the airbag 11, each airbag 11 is provided with a peripheral elastic strap 50 exerting pressure on the casing 11' of the airbag 11.

The strap 50 can surround said casing or the face of the airbag 11 that is not in contact with the torso of the occupant 7, for example.

In addition, said strap 50 may be fastened to the ends of the airbag 11 only.

It should be noted that the elasticity of the strap 50 ensures the airbag 11 can be inflated.

Therefore, while the expulsion means are not connecting the inside of the airbag 11 to the surrounding air, the strap 50 does not hinder inflation of the airbag 11. Conversely, when the airbag is connected to the surrounding air via the expulsion means 20, the pressure exerted by the strap on the casing of the airbag causes the airbag 11 to deflate.

In another aspect, it should be noted that each expulsion means 20 is arranged on the feed pipe 13 for feeding the inflation fluid, e.g. air, to an airbag. However, it is possible to arrange these expulsion means on the airbag, for example.

The expulsion means 20 may comprise an outlet orifice 22 opening out to the outside of the protective device 10 and a moving member 21 such as a piston suitable, for example, for preventing the inflation fluid from passing through the outlet orifice 22 when it is in a first position, and for allowing the inflation fluid to pass through the outlet orifice 22 when it is in a second position.

In an electrical first embodiment shown in FIG. 1, an electric motor 24 drives the moving member 21 so as to move it from the first position to the second position if water detection means 15 detect the presence of water. For example, the motor 24 then causes an endless screw 24' to turn in order to move the moving member 21 and in order to put the inside of the airbag 11 into communication with the outlet orifice 22.

The expulsion means may also be a solenoid valve of some known type.

In this first embodiment, a control unit 14 is provided with a battery 14' and with a changeover switch 14" that is electrically connected to an inflator 12', said inflator 12' being electrically connected to the expulsion means 20 that loop back to the control unit 14.

In addition, the detection means 15 comprise at least one detection sensor 100 for detecting a predetermined event, such as a water presence sensor, a fire detection sensor, or indeed a seat harness opening sensor, the detection sensor 100 being connected electrically to a main switch 110 arranged between the inflator 12' and the expulsion means 20.

In addition, a capacitor 130 is electrically connected in parallel with the expulsion means 20 and with the main switch 110 between the inflator 12' and the control unit 14.

In addition, in the variant shown, the detection means 15 co-operate with a main switch 110 and with a secondary switch 120 arranged between the control unit 14 and the inflator 12'.

It should be noted that the main switch 110 and the secondary switch 120 can be part of a single switch having two paths.

FIGS. 3 to 6 explain how an electrical embodiment operates.

With reference to FIG. 3, independently of the positions of the main switch 110 and of the secondary switch 120, the changeover switch 14" is open in the absence of the predetermined conditions. Therefore, the airbag cannot be inflated.

With reference to FIG. 4, under the predetermined conditions, the changeover switch 14" is closed. However, if the detection means 15 indicate the presence of a predetermined event, e.g. opening of the seat harness, prior to inflation of the airbag, the secondary switch remains open. Therefore, the airbag cannot be inflated.

With reference to FIG. 5, if the detection means do not detect the occurrence of a predetermined event, then the secondary switch 120 is closed.

Whereupon, the inflator 12' is electrically powered and inflates the airbag.

In addition, the detection means do not detect the occurrence of a predetermined event, namely, for example, the presence of water, the presence of fire, and opening of a seat harness, subsequently to inflation of the airbag. As a result, the main switch 110 opens.

Since the capacitor 130 is being charged, the expulsion means are not driven.

With reference to FIG. 6, once the airbag has been inflated, and if a predetermined event occurs, the main switch 110 closes and the secondary switch 120 opens. The expulsion means 20 are then electrically powered by the capacitor 130 in order to empty the airbag.

It should be noted that the detection means 15 are optionally provided with soluble means for determining the presence of water. These soluble water-detection means 15 may be arranged on the seat, or indeed they may be remote from the seat proper zone 3 and from the seat back zone 4 of the seat in order to detect any entry of water into the vehicle as early as possible.

With reference to FIG. 7, in a second preferred embodiment, the expulsion means 20 are mechanical means provided with the detection means 15 comprising a water detection member.

The protective device then, for example, has a control unit 14 connected via electrical links 12" to one inflator 12' per airbag, each inflator being connected to a respective airbag via a feed pipe 13 such as a feed pipe 13 going, for example, via fastening means 8 for fastening a seat harness 6, to reach an airbag arranged in said seat harness 6. In addition, self-contained expulsion means 20 provided with a water detection member are arranged on each feed pipe 13.

With reference to FIG. 8, the expulsion means 20 may comprise a T-shaped duct 31. A first end 31' is then fastened to a first portion 13' of the feed pipe 13, e.g. by means of spring clipping, a second end 31" being fastened to a second portion 13" of said feed pipe 13, optionally by means of spring clipping. The third end 31'" of the duct 31 projects towards the outside of the feed pipe 13, said third end being provided with an outlet orifice 22 for removing to the outside EXT the inflation fluid contained in the airbag 11.

In addition, the expulsion means 20 further comprise a stopper 30 fastened to the third end 31'" via a thread 210 or via any equivalent means. This stopper 30 may further include an end wall provided with holes 34.

In addition, the expulsion means 20 further comprise a moving member 21 such as a piston 21' secured to a rod 25, the rod 25 extending from a first distal segment 25' fastened to the piston towards a second distal segment 25".

The moving member, and in particular the piston 31' of said moving member is disposed upstream from the outlet orifice 22, relative to the direction in which a fluid flows from the feed pipe 13 to said outlet orifice 22. A gasket 22' is disposed between the moving member 21' and the third end 31'" of the duct 31.

When the moving member 21 is in the first position shown in FIG. 8, said moving member prevents fluid from flowing from the feed pipe 13 to the outlet orifice 22. In addition, it should be noted that the second distal segment 25" comes into abutment against a back seat 35 of the stopper 30 in order to prevent the moving member from moving unduly under the effect of the pressure prevailing in the segment of the duct 31 going from the first end 31' towards the second end 31".

In addition, the moving member 21 co-operates with soluble means 15'.

Thus, the expulsion means 20 further comprise holding means 32 for holding the moving member 21 in the first position under the influence of the soluble means, and for guiding the moving member in its movement from the first position towards a second position.

These holding means 32 comprise a plate 37 provided with holes 33, the plate 37 being wedged between a shoulder of the third end 31" and the stopper 30. Thus, the outlet orifice 22 is disposed between the plate 37 and the piston 21' situated upstream from said outlet orifice 22.

In addition, the holding means 32 are provided with angularly spaced-apart holding tabs 36 that project from the plate 37. These holding tabs are then surrounded by the soluble means 15', said soluble means pressing the holding tabs 36 against the second distal segment 25", in particular so as to hold the moving member in the first position shown in FIG. 8.

Each holding tab 36 is advantageously provided with a holding member 36' co-operating by means of interfering shapes with a holding segment of the second distal segment 25". For example, each holding member 36' comprises a lug co-operating with a notch in a holding segment 26', 26" of the second distal segment 25". It should be noted that the second distal segment 25" may have a first holding segment 26' and a second holding segment 26".

Finally a spring is arranged between the plate 37 and the portion of the moving member 21 that prevents fluid from flowing towards the outlet orifice 22, which portion is the piston 21' in this example.

With reference to FIG. 8, in the absence of water, the soluble means guarantee contact between the holding members 36' and the first holding segment 26' of the moving member. Said moving member then finds itself in a first position, in which, in particular, it prevents the inflation fluid present in the airbag 11 from escaping via the outlet orifice 22.

Conversely, with reference to FIG. 9, in the presence of water, the soluble means 15' are dissolved. In the absence of force exerted by said soluble means on the holding tabs, the spring 200 pushes away the moving member 21 as indicated by arrow F1, the holding tabs 36 moving in parallel as indicated by arrows F2.

When the moving member reaches the second position shown in FIG. 9, the holding members 36' can be in engagement with the second holding segment 26" of the moving member.

In this position, the inflation fluid of the airbag 11 can escape towards the outside EXT via the outlet orifice 22, as indicated by arrows F3, and optionally via the holes 34 in the stopper that constitute additional outlet orifices. It should be noted that the pressure of the strap on the casing of the airbag facilitates this expulsion of the inflation fluid.

Naturally, the present invention may be subject to numerous variations as to its implementation. Although several embodiments are described, it can readily be understood that it is not conceivable to identify exhaustively all possible embodiments. It is naturally possible to replace any of the means described with equivalent means without going beyond the ambit of the present invention.

What is claimed is:

1. A protective device for protecting an occupant of a vehicle, the protective device comprising an airbag and an inflator for inflating the airbag, the inflator being connected to the airbag via a feed pipe for feeding inflation fluid for the purpose of inflating the airbag under predetermined conditions;
    wherein the protective device further comprises expulsion means for expelling the fluid, which expulsion means co-operate with at least one detection means for detecting a predetermined event so as to act when such a predetermined event occurs to remove the fluid resulting from inflation of the airbag subsequently to inflation of the airbag, the airbag being provided with a peripheral elastic strap for optimizing the deflation of the airbag when the expulsion means allow the fluid to be removed from the airbag;
    the inflator being connected to the airbag via the feed pipe, and a control unit connected to the inflator, the control unit instructing the inflator to inflate the airbag under the predetermined conditions; and
    wherein the control unit includes an electrical battery and a changeover switch that are connected in series to the inflator, the expulsion means being connected electrically to the inflator and to the control unit.

2. A protective device according to claim 1, wherein the expulsion means are arranged on the feed pipe.

3. A protective device according to claim 1, wherein the event is to be chosen from a list including a presence of water, a presence of fire, and an opening of a seat harness subsequent to inflation of the airbag.

4. A protective device according to claim 1, wherein, with the expulsion means comprising an outlet orifice and a moving member suitable for preventing inflation fluid from passing through the outlet orifice in the absence of the predetermined event, the detection means co-operate with the moving member to allow the inflation fluid to pass through the outlet orifice in the presence of the predetermined event.

5. A protective device according to claim 4, wherein the detection means include water detection means provided with soluble means co-operating with the moving member.

6. A protective device according to claim 1, wherein the detection means comprise a sensor for sensing the event, which sensor is connected electrically to a main switch arranged between the inflator and the expulsion means, the main switch being closed when the event occurs, a capacitor being connected electrically in parallel with the expulsion means and with the main switch between the inflator and the control unit.

7. A protective device according to claim 6, having a secondary switch arranged between the control unit and the inflator and co-operating with the detection means.

8. A vehicle seat for a vehicle, wherein the seat includes a protective device according to claim 1.

9. A vehicle seat according to claim 8, wherein the airbag is arranged on a seat harness of the seat.

10. A vehicle seat according to claim 8, wherein, with the seat having a seat proper zone and a seat back zone, the detection means are remote relative to the zones.

11. A vehicle, including a protective device according to claim 1.

12. A protective device for protecting an occupant of a vehicle, the protective device comprising an airbag and an inflator for inflating the airbag, the inflator being connected to the airbag via a feed pipe for feeding inflation fluid for the purpose of inflating the airbag under predetermined conditions;

wherein the protective device further comprises expulsion means for expelling the fluid, which expulsion means co-operate with at least one detection means for detecting a predetermined event so as to act when such a predetermined event occurs to remove the fluid resulting from inflation of the airbag subsequently to inflation of the airbag, the airbag being provided with a peripheral elastic strap for optimizing the deflation of the airbag when the expulsion means allow the fluid to be removed from the airbag;

the inflator being connected to the airbag via the feed pipe, and a control unit connected to the inflator, the control unit instructing the inflator to inflate the airbag under the predetermined conditions; and wherein the detection means comprise a sensor for sensing the event, which sensor is connected electrically to a main switch arranged between the inflator and the expulsion means, the main switch being closed when the event occurs, a capacitor being connected electrically in parallel with the expulsion means and with the main switch between the inflator and the control unit.

13. A protective device for protecting an occupant of a vehicle, the protective device comprising an airbag and an inflator for inflating the airbag, the inflator being connected to the airbag via a feed pipe for feeding inflation fluid for the purpose of inflating the airbag under predetermined conditions;

wherein the protective device further comprises expulsion means for expelling the fluid, which expulsion means co-operate with at least one detection means for detecting a predetermined event so as to act when such a predetermined event occurs to remove the fluid resulting from inflation of the airbag subsequently to inflation of the airbag, the airbag being provided with a peripheral elastic strap for optimizing the deflation of the airbag when the expulsion means allow the fluid to be removed from the airbag;

the inflator being connected to the airbag via the feed pipe, and a control unit connected to the inflator, the control unit instructing the inflator to inflate the airbag under the predetermined conditions; and the protection device having a main switch and a secondary switch, the secondary switch being arranged between the control unit and the inflator and co-operating with the detection means.

* * * * *